Sept. 11, 1962 J. REISER 3,053,638

METHOD AND APPARATUS FOR PRODUCING HYPERPURE SILICON RODS

Filed Oct. 31, 1960 2 Sheets-Sheet 1

Sept. 11, 1962 J. REISER 3,053,638

METHOD AND APPARATUS FOR PRODUCING HYPERPURE SILICON RODS

Filed Oct. 31, 1960 2 Sheets-Sheet 2

3,053,638

METHOD AND APPARATUS FOR PRODUCING HYPERPURE SILICON RODS

Joseph Reiser, Munich, Germany, assignor to Siemens & Halske Aktiengesellschaft, Munich, Germany, a corporation of Germany Filed Oct. 31, 1960, Ser. No. 66,357
Claims priority, application Germany Nov. 2, 1959
5 Claims. (Cl. 23—223.5)

My invention relates to a method and apparatus for producing rods of hyperpure silicon or other semiconductor substance.

According to the method disclosed in the copending patent application Serial No. 861,317, assigned to the assignee of the present invention, an elongated, thin carrier body of hyperpure silicon or the like substance of extremely slight electric conductance is held at both ends by electrodes and, after being pre-heated is brought up to a high temperature by passing electric current through the carrier and through the electrodes, thus increasing the conductance of the carrier. In this hot condition, the carrier is subjected to an atmosphere which preferably flows along the elongated body and which consists of a purified gaseous semiconductor compound which may be mixed with pure hydrogen. As a result, semiconductor substance is precipitated from the atmosphere and crystallizes onto the carrier. The body thus gradually increases in thickness to form a semiconductor rod. At the beginning of the process, the resistance of the carrier is reduced to a small value by employing special expedients, such as heating, in addition to the source of operating current or in lieu thereof. These auxiliary expedients cause additional heating of the carrier for reducing the cooling effect to which it is subjected. As long as the reduced resistance of the carrier is thus made effective, the operating current flowing through the carrier and originating exclusively from the source of normal operating current is able to increase or maintain the carrier temperature despite the strong cooling effect occurring during operation, thus correspondingly reducing the terminal voltage of the carrier. As a result, the carrier is thereafter maintained, by the operating current furnished by the source of normal operating current, at the temperature required for decomposing the semiconductor compound and for producing a compact precipitation of the semiconductor substance onto the carrier. The operation according to this method is preferably such that the voltage of the source of normal operating current is smaller than the maximum terminal voltage of the carrier as it obtains at the commencement of the method in accordance with the current-voltage diagram of the carrier under the cooling conditions obtaining during operation.

It is an object of the present invention to improve the utilization of the voltage source by having several carriers in such a precipitation process electrically connected with each other in series relation, and to mount the carriers within one and the same reaction vessel for better economy in the use of the reaction gas. In this case, the current furnished from the source of normal operating current flows in series not only through a series resistor required for stabilizing purposes, but also through a number of series connected semiconductor bodies. Each of these semiconductor carrier bodies possesses its own current-voltage characteristic which is such that with increasing current the voltage at the carrier at first also increases and exhibits a maximum at a given current value depending upon the individual carrier, whereas with further increasing current the carrier voltage declines regularly.

However, in the case of several carriers thus connected in series, a choice of the normal operating point is determined not by the current-voltage characteristic of an individual carrier, but rather by the resultant current-voltage characteristic of the totality of all carriers. This working point, or normal operating point, on the current-voltage characteristic, in accordance with the teaching of the prior application as applied to the series connection of several carriers, is to be located in that range of the resulting current-voltage characteristic of all carriers, at which an increase of the operating current causes a decrease of the entire voltage drop at all carriers.

However, the proper adjustment of this normal working point encounters difficulty in the production of hyperpure silicon by means of several carriers connected in series to the source of normal operating current. Such difficulties can be obviated only if another voltage source is employed, in addition to the normal operating voltage of the main source, for the purpose of facilitating the switching-on of the operating current. As a rule, the length of the carriers is made as great as permissible by the dimensions of the reaction vessel for the purpose of obtaining a good yield of the process. For that reason, correspondingly high additional voltage must be employed for starting the normal operating current, and this auxiliary voltage exceeds by a multiple the ordinary operating voltage which is impressed upon the totality of the series connected carriers during the normal precipitating operation. Such a high auxiliary voltage is undesirable for safety reasons. In addition, it is often advisable to perform the above-described method with a source of operating current consisting of a regulated current source, for example a welding rectifier, which, when operating upon a load whose electric resistance is within a given resistance interval, generates a constant current adjusted and maintained by regulation of the current source. This resistance interval or range permissible for use of such a regulated current source is not sufficient, as a rule, to simultaneously permit a constant regulated current in all carriers of a series connected group as long as these carriers are still in cold condition and often also when they are already in preheated condition, whereas such current sources are readily capable of satisfactory operation once the carriers have reached the ordinary operating stage. In view of the stabilization of the normal operating point in the descending range of the carrier characteristic, as explained in the copending application, the use of such a regulated current source is particularly advantageous.

It is another object of my invention to eliminate the above-mentioned difficulties encountered during the initiation of the precipitation method when using a plurality of series connected silicon carriers.

To this end, and in accordance with a feature of my invention, at least two individually separate but electrically series-connected carriers are placed within one and the same reaction vessel, these carriers being in connection with each other only by electric leads. During the initial stage of the process, at least one of these carriers is connected to the voltage of the normally operating current source, and at least one other rod of the series-connected group is kept short-circuited until the current-voltage condition of the current-traversed carriers attains a condition corresponding to a working point in the descending range of the individual current-voltage characteristic of each of these other carriers. Thereafter, if desired, successively, the remaining carriers are switched into the circuit of the source of operating current, and the working point of the latter carriers is adjusted to be located in the descending branch of the individual current-voltage characteristic of these carriers. In this manner, the current-voltage condition of the totality of all carriers corresponds to a working point, stabilized by external circuit components, which is located in a descending branch of the resultant current-voltage characteristic of all carriers.

According to another feature of my invention, it is preferable to keep the voltage of the source of normal operating current smaller than corresponds to the (smallest) maximum of the resultant current-voltage characteristics of the totality of all carriers. In some cases, the voltage of the source of normal operating current can even be made smaller than corresponds to the maximums of the current-voltage characteristics of the individual carriers, if the intersection point of the current-voltage characteristic of the external circuit components with the resultant current-voltage characteristic of all carriers results in a current suitable for normal operating conditions.

The invention will be explained in conjunction with the drawings, in which:

FIG. 1 presents three graphs of the current-abscissae, voltage-ordinate characteristics of the silicon carrier rod, at three stages of the precipitation process.

In discussing the process of precipitating silicon upon a plurality of serially connected silicon carriers excited by a source of current and mounted in a processing chamber, the effects of current through a single silicon carrier will be considered.

Figure 1:
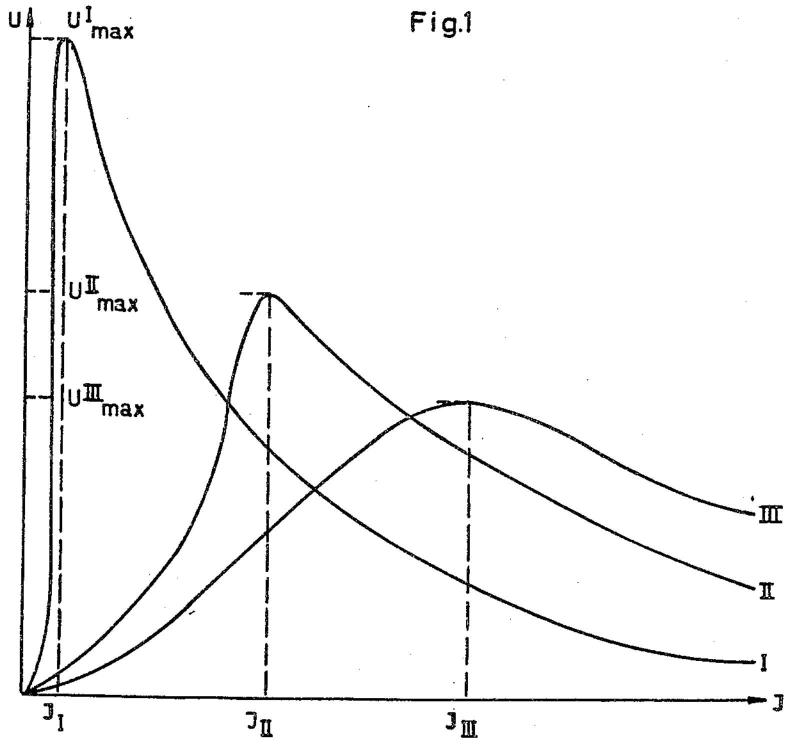

Since a silicon carrier may have a high resistance of approximately 5,000 ohms when cool, which resistance decreases to but a few ohms when heated, the effect of current through a silicon carrier is similar to that shown in any of the curves in FIG. 1. According to curves I, II or III of FIG. 1, the voltage drop U across a single silicon semiconductor body to which current is applied by means of an external current source at first increases with increasing current through the carrier and reaches a maximum $U_{max}$ at a given current value $\bar{J}$, whereafter the voltage drop declines continuously as the current increases. With constant cooling conditions, the power supply to the carrier, converted into heat gradually increases with increasing current through the semiconductor body.

Consequently, two different points of the same current-voltage characteristic of a single body are never located on the same curve of constant power input (i.e. on the hyperbolas $U \cdot J$=const.), but any point of this characteristic pertaining to a greater current value of J always corresponds to a higher power input than any point corresponding to a smaller value of J.

According to the foregoing, the current-voltage characteristic of a single carrier in the range $J<\bar{J}$ exhibits a stable behavior, whereas the behavior is instable in the range $J>\bar{J}$; and the curvature of the characteristic changes its direction in the instable as well as in the stable range. The directional reversing point in the stable range is due to the fact that the electric resistance of silicon, even in hyper-pure condition, and also with higher starting temperature than corresponds to the normal room temperature of 20° C., will first increase when the current through the carrier is increased. The "starting temperature" is the temperature which a single silicon carrier being tested will assume if no heat is produced in the carrier by current passing therethrough; and this starting temperature, in general, is substantially identical with the ambient temperature. Aside from the silicon material being used, the quantitative course of the current-voltage characteristic is determined by the thickness and length of the carrier as well as by the quantity of the heat dissipated to the environment and hence by the cooling effects obtaining during the precipitating operation. Particularly dependent upon these conditions is the magnitude of the voltage $U_{max}$ as well as the current value $\bar{J}$ correlated to this voltage value. The thicker the carrier and the lower the environment temperature, the greater becomes $\bar{J}$ and the more will the voltage maximum of the current-voltage characteristic become displaced toward the right. Furthermore, the value of the voltage $U_{max}$ increases with increasing intensity of the cooling being employed and with decreasing thickness of the carrier. An increase in length of the carrier acts in the sense of increased $U_{max}$ values, whereas the value of the correlated current $\bar{J}$ is not affected.

In accordance with the foregoing, the current-voltage characteristic of the carrier, during the course of the precipitating operation continuously varies toward increasing current values of $\bar{J}$ with a simultaneous displacement of the maximum temperature $U_{max}$, as is apparent from FIG. 1. The curve I corresponds to the current-voltage characteristic of the original carrier. The curves II and III correspond to the current-voltage characteristics in progressed stages of the precipitating operation.

When precipitating silicon on a single silicon carrier heated in a furnace by an external voltage applied to the carrier, the working point of the $J$—$U$ characteristics adjusts itself during operation, and is determined by the resistance of the external circuit components connected to the external voltage circuit. This operating point is defined by the intersection or intersections of the particular current-voltage characteristic of the heated silicon carrier with the resultant current-voltage characteristic of these external circuit components. If these external circuit components are purely ohmic, the $J$ vs. $U$ characteristic is represented by the straight line $U=E-R_a \cdot J$, in which E is the operating voltage of the externally applied source and $R_a$ the total series resistance of the external circuit components.

It is possible to adjust the working point in the stable range of a carrier characteristic. However, in the method according to the present invention, a plurality of serially connected carriers are cooled so strongly during the precipitating operation that it is necessary to operate in the instable range of the carrier, i.e. in the descending portion of the $U$—$J$ characteristic and hence at current intensities of the value at which the $U$—$J$ characteristic of the carrier has its maximum. More power is, however, necessary than with operation in the stable range. U-maximum under the cooling conditions obtained during precipitation, particularly at the commencement of the precipitation upon a carrier of the desirable thin cross section, is very high. $U_{max}$ for a plurality of serially connected carriers would be even higher.

When a plurality of carriers are serially connected across a current source, this would make it necessary to perform the method with very high operating voltages. Furthermore, due to the thickening of the carriers by the precipitating substance, the descending branch of the $U$—$J$ characteristic of the carriers may increase above the linear resistance, resulting from the electromotive voltage (EMK) of the source of operating current and the sum of the internal resistance of this source and the voltage drop of the resistance connected in series with the carrier. Due to the intensive cooling, the just-mentioned effect would result in an undesirable and rapid decrease in surface temperature of the carrier.

The operating point on the $U$—$J$ characteristic of an externally excited silicon body may be effectively placed on the instable portion of the characteristic by pre-heating the silicon. The operating temperature should be approximately 1100° C.

With this preheat, the maximum of the $U$—$J$ characteristic of the carrier is reduced to such an extent that it becomes at least temporarily smaller than the terminal voltage impressed upon the carrier when the source of operating current is switched on.

The use of a current source of higher voltage, having a series impedance, raises the resistance line of the externally connected current source circuit relative to the *U—J* characteristic of the carrier. The resistance line is raised above U-maximum to such an extent that the carrier is heated to a sufficiently high temperature and kept at high temperature despite the intensive cooling effective during the operation. This high voltage external current source will have a *U—J* characteristic intersecting the instable range of the *U—J* characteristic of the individually excited silicon carrier. The voltage of the current source may then be reduced to a normal operating voltage during precipitation.

The other one of the above-mentioned two disadvantages caused by working in the instable range of the *U—J* characteristic, is overcome in that, while regulating the surface temperature, the electromotive force of the source of operating current, active during the precipitating operation, as well as the magnitude of the series-connected resistance, is kept so small that the resistance lines (FIG. 2) resulting therefrom do not drop below the negative branch of the particular current-voltage characteristics.

The cooling effects during pre-heating with the higher voltage may be varied from those during the precipitating operation proper. Since the gases, particularly the silicon chloroform and the hydrogen, passing through the vessel, have very low temperatures in comparison with the desired surface temperature of the carrier, it is advisable therefore to keep the cooling low during heating-up by causing these gases not to flow through the processing vessel during the heating-up period.

When a single silicon carrier is heated by an external source, in order to adjust a working point in the descending range of the carrier characteristic, a controllable stabilizing resistor is connected as an external circuit component in the circuit of the carrier, and a current source of high voltage, preferably an alternating-current source, is applied to the carrier. The voltage of the source is preferably so high at first that the current-voltage characteristic of the external circuit components connected with the auxiliary source will intersect the current-voltage characteristic of the carrier only in the descending range. The voltage is then decreased so that the *U—J* characteristics of the external circuit components intersect the other characteristics at three points. An exact adjustment of the working point, upon which the temperature of the carrier depends, is possible only after applying the reaction gas to the processing vessel.

In order to prevent change of operating point on the *U—J* characteristics of the carrier to the stable range as the carrier diameter increases, the series-connected resistance and, if desired, the voltage of the source of operating current are kept during precipitation at values at which the resulting straight resistance line or other resulting current characteristic of the external circuit components stabilizing the operating current, at least remain tangent to, or preferably intersect, the descending branch of the current-voltage characteristics of the carrier rod.

Figure 2:
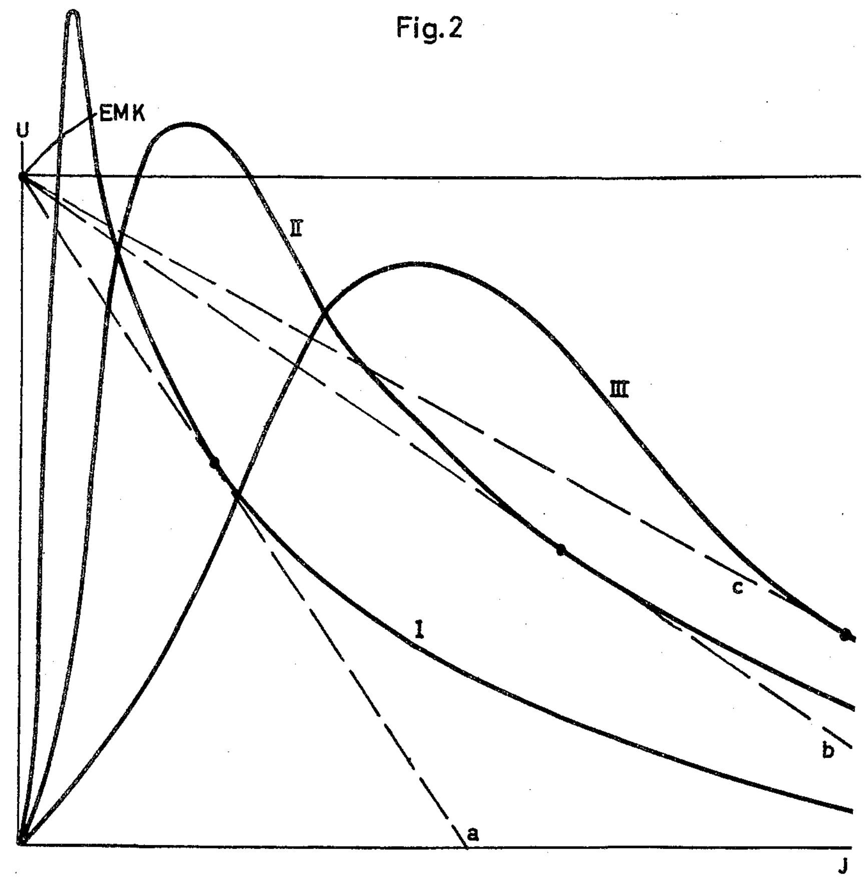
FIG. 2 is a graph, the significance of which is explained below.

This is illustrated in the diagram of FIG. 2 for the case of purely ohmic characteristics of the external circuit components. Curve I corresponds to the characteristic of the original carrier rod which, due to precipitation and thickening, gradually converts to the curves II and IIII.

Generally, the characteristic of the external circuit components is adjusted so that two intersections in the descending range of the carrier characteristic will result. Then, in general, the operation will adjust to the lower, more stable operating point.

Temperature drop must continuously be compensated during the precipitation method since decrease in temperature causes a displacement of the working point. This displacement compensates the effect of the increasing cooling that takes place with increasing carrier diameter. The simplest way of doing this is to continuously measure the carrier temperature by means of a pyrometer, a photocell or any other suitable temperature-sensing device responding to heat radiation, and by increasing the current flowing through the carrier rod by reducing the resistance of the external circuit components when a decrease in carrier temperature is ascertained, so that the datum value of temperature is immediately re-established. It is advisable to keep the smallest possible adjustable resistance of the external circuit components so great that the current resulting from this resistance, and the voltage of the source of operating current, is incapable of destroying the carrier rod as long as it has not yet increased its diameter.

When using a plurality of carriers in series connection, the resultant current-voltage characteristic is determining for the adjustment of the working point, this resultant characteristic being the sum of the characteristics of the individual carriers used. It possesses the same shape as the characteristics of the individual carriers if these do not exhibit excessive differences with respect to dimensioning and constitution. Otherwise, however, several maximums may occur in the resultant current-voltage curve. In all cases, however, there is a current value beyond which an increasing current causes the characteristic to always descend regularly. This is the range according to which the point of normal operation is to be placed in accordance with the present invention.

Since the current-voltage characteristic of the respective carriers, and hence also the resultant characteristic of the totality of carriers, becomes displaced in the course of the precipitation process, care must be taken, in accordance with the above teaching that the working point remains within the descending range of the total characteristic during the entire duration of the precipitation process. Consequently, the use and expedients indicated in the above with respect to the use of an individual carrier, must be applied analogously to the resultant total characteristic.

Figure 3:
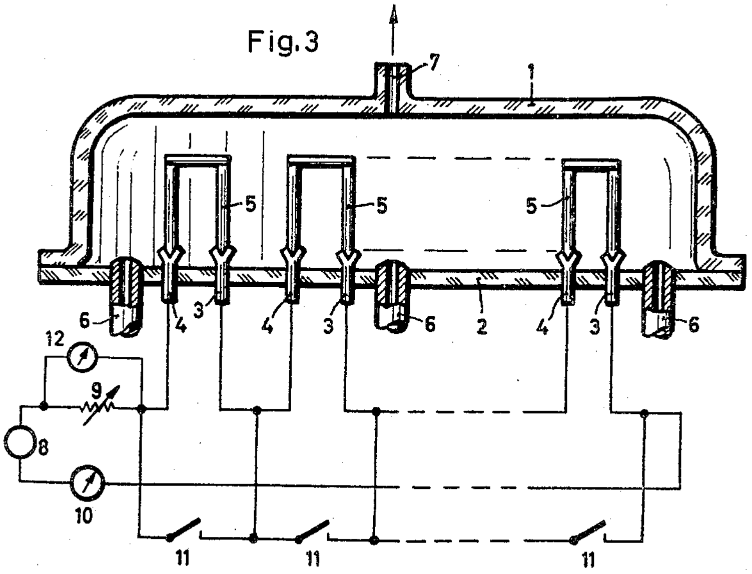
FIG. 3 illustrates an apparatus system employed to carry out the invention.

In the apparatus of FIG. 3, the reaction vessel consists of a bell 1 of quartz and a bottom 2 also of quartz. Electrode pairs 3 and 4 pass vacuum-tightly through the quartz bottom 2 and form holders for the carriers 5. Each of these carriers consists of two rods which are interconnected by a bridge 5' of pure silicon at the ends remote from the holders. Each silicon bridge consists of a silicon rod which is placed transversely over the ends of the two rods and is welded thereto. Inlet duct 6 and an outlet duct 7 are provided for supplying and withdrawing the reaction gas.

Each individual carrier is connected to the source 8 having a voltage greater than the $U_{max}$ in the *U—J* characteristic of any of the cool silicon carriers, but less than the $U_{max}$ in the composite *U—J* characteristic of all the carriers. The voltage may be higher than the $U_{max}$ in the composite characteristic of all, but one of the serially connected carriers or higher than the $U_{max}$ of just one carrier, and still remain in the limits described. An adjustable series-connected resistor 9 is inserted into the operating circuit for the purpose of stabilization. Switches 11 permit short-circuiting of the individual carriers 5 with respect to the operating-current source 8 or to disconnect them from the source. A measuring instrument 10 is provided for supervising the operating current.

The performance of the process is effected by first short-circuiting a number of the carriers so that only the remaining carriers, connected to the normal operating voltage, are traversed by a current. During the ensuing temperature increase, there occurs a reduction of the voltage drop at the connected carriers and hence an increase in voltage drop at the series resistor 9. This voltage drop of resistor 9 is ascertained by means of a voltmeter 12 of low current consumption which is connected parallel to the resistor 9. During this stage of operation, the working point of the current-traversed carriers adjusts itself to the descending range in the respective characteristics of these carriers. Thereafter, further carriers are connected into the circuit, and the working point of the combination of carriers now impressed by the operating voltage is displaced into the descending range of the total current-voltage characteristic of the combination until ultimately all carriers are connected to the operating-current source and the working point is reliably placed into the descending range of the resultant characteristic of the totality of carriers. Thereafter, the reaction gas is supplied to the vessel, the operating current is adjusted to the value required for producing the precipitation temperature, and the precipitation is then effected in the same manner as already described above.

With respect to the electric leads passing into the reaction vessel and extending within the vessel between the individual carriers, a high resistance to temperature must be required. For that reason, the use of high-temperature resistant and chemically inactive metals such as molybdenum, chromium or tungsten is preferable. It is further preferable, for highest purity of the silicon to be precipitated, to provide all electric leads, holders and electrodes, inasmuch as they are located within the reaction vessel, with a coating of hyperpure silicon, $Si_3N_4$ or $SiO_2$, or, if compatible with the functioning of these items, to make them completely from these semiconductor materials. The wall of the reaction vessel is preferably made of quartz.

It should be noted that the beforementioned copending application Serial No. 861,317, assigned to the assignee of the present invention, is an improvement of the application Serial No. 665,086, now Patent No. 3,011,877. The present application also improves on the method and apparatus described therein.

While an embodiment of the invention has been described herein, it will be understood that this is for illustrative purposes only and that I do not wish to be limited thereby.

I claim:

1. In a process for the production of crystal rods from a hyperpure semiconductor substance having a low conductance at low temperatures and decreasing resistance at increasing temperatures, and a rising-then-descending current versus voltage characteristic as the temperature rises, wherein carrier bodies of the substance are heated to a high temperature by electric current supplied through the electrodes by a control source of operating current, wherein the carriers are then converted to thick rods by the substance which crystallize upon the carriers and are precipitated from a purified gaseous compound, the improvement comprising: connecting at least two individual separate carriers in series with respect to a source of operating current, disposing the carriers in the same reaction vessel, connecting at least one of the carriers to the voltage of the operating source at the beginning of the process, short-circuiting at least another electrode until the current-voltage conditions of the non-short-circuited carriers correspond to a predetermined working point in the descending range of the individual current versus voltage characteristic of each of these carriers, whereby the non-short-circuited carrier exhibits a high conductance, switching the other carriers into the circuit of the operating source current, adjusting the current versus voltage condition of these carriers to a working point in the descending branch of the individual current versus voltage characteristics of these carriers, whereby ultimately the current versus voltage condition of the totality of all carriers corresponds to a predetermined working point stabilized by said controllable circuit source, which working point is located in the descending range of the resultant current versus voltage characteristic of the serially connected carriers and which range descends throughout.

2. In a process according to claim 1, the substance being silicon and the purified gaseous compound being silicon.

3. In a process according to claim 2, wherein the improvement further includes the step of controlling the operating current source to supply a voltage across the series-connected carriers smaller than the maximum voltage of the resultant current versus voltage characteristic of the series-connected carriers.

4. An apparatus for the production of crystal rods from pure material having a low conductance at low temperatures, a high conductance at high temperatures and a rising-then-descending current versus voltage characteristic as temperature rises, comprising a reaction chamber connector means for holding carriers of the material in the reaction chamber, and serially connecting a plurality of carriers, means for passing gases carrying precipitate of the material past the carriers in the reaction chamber, current source means connected to the extreme terminals of said serially connected carriers, and means for electrically bypassing at least one of said carriers; said connector means including electrode means arranging the rod-shaped silicon carriers perpendicular to a portion of the reaction vessel wall, and holding the carriers fast in their positions, said electric means passing through the wall portion and engaging one carrier end, and a rod-shaped bridge of pure silicon interconnecting the free ends of each carrier pair.

5. An apparatus as in claim 4, wherein the voltage of said current source is greater than the peak voltage of the current versus voltage characteristics of the individual carriers and less than the peak voltage of the current versus voltage characteristics of the composite of the serially connected carriers.

References Cited in the file of this patent

UNITED STATES PATENTS

| | | |
|---|---|---|
| 2,763,581 | Freedman | Sept. 18, 1956 |
| 2,981,605 | Rummel | Apr. 25, 1961 |